United States Patent
Kitanaka et al.

(10) Patent No.: US 7,723,944 B2
(45) Date of Patent: May 25, 2010

(54) VECTOR CONTROL DEVICE OF INDUCTION MOTOR, VECTOR CONTROL METHOD OF INDUCTION MOTOR, AND DRIVE CONTROL DEVICE OF INDUCTION MOTOR

(75) Inventors: Hidetoshi Kitanaka, Chiyoda-ku (JP); Hideto Negoro, Chiyoda-ku (JP)

(73) Assignee: Mitsubishi Electric Corporation, Chiyoda-Ku, Tokyo (JP)

( * ) Notice: Subject to any disclaimer, the term of this patent is extended or adjusted under 35 U.S.C. 154(b) by 0 days.

(21) Appl. No.: 12/306,833

(22) PCT Filed: Aug. 3, 2006

(86) PCT No.: PCT/JP2006/315397
§ 371 (c)(1),
(2), (4) Date: Dec. 29, 2008

(87) PCT Pub. No.: WO2008/004316
PCT Pub. Date: Jan. 10, 2008

(65) Prior Publication Data
US 2009/0256518 A1    Oct. 15, 2009

(30) Foreign Application Priority Data
Jul. 6, 2006    (WO) .................. PCT/JP2006/313478

(51) Int. Cl.
*H02P 27/04*    (2006.01)
(52) U.S. Cl. .................. 318/802; 318/800; 318/807
(58) Field of Classification Search .................. 318/802, 318/800, 807, 805, 721, 798, 799, 723, 727, 318/801, 803
See application file for complete search history.

(56) References Cited
U.S. PATENT DOCUMENTS
5,021,724 A * 6/1991 Hirano et al. ............... 318/800

FOREIGN PATENT DOCUMENTS
JP    10-004696 A    1/1998
JP    11-285299 A    10/1999
JP    2004-187460 A    7/2004
JP    2006-094646 A    4/2006

OTHER PUBLICATIONS

Form PCT/ISA/210 (International Search Report) dated Oct. 10, 2006.
Yooske Nakazawa et al., "A New Vector Control for Induction Motor Drives in Full Block Mode of Inverters", Journal of IEEJ, 1998, vol. 118-D, No. 9, pp. 1071-1080 (with English Abstract).

* cited by examiner

*Primary Examiner*—Karen Masih
(74) *Attorney, Agent, or Firm*—Buchanan Ingersoll & Rooney PC

(57) ABSTRACT

The vector control device includes: secondary magnetic flux command computing means (40) for computing a secondary magnetic flux command to an induction motor (6) by taking a maximum voltage that an inverter (4) can generate into account on a basis of a torque command from an external, a DC voltage to be inputted into the inverter, and an inverter angular frequency, which is an angular frequency of an AC voltage to be outputted from the inverter; q-axis/d-axis current command generating means (8 and 9) for generating a q-axis current command and a d-axis current command on a d-q axes rotating coordinate system in reference to a secondary magnetic flux of the induction motor (6) on a basis of the torque command and the secondary magnetic flux command; output voltage computing means (voltage non-interference computation portion 14, adder 17, and adder 18) for computing an output voltage that the inverter (4) is to output on a basis of the q-axis current command, the d-axis current command, and a circuit constant of the induction motor (6); and voltage command/PWM signal generating means (50) for controlling the inverter (4) for the inverter (4) to output the output voltage.

12 Claims, 7 Drawing Sheets

VECTOR CONTROL DEVICE OF INDUCTION MOTOR, VECTOR CONTROL METHOD OF INDUCTION MOTOR, AND DRIVE CONTROL DEVICE OF INDUCTION MOTOR

TECHNICAL FIELD

The present invention relates to a vector control device of an induction motor connected to an inverter that converts a DC voltage to an AC voltage at an arbitrary frequency to output the AC voltage, a vector control method of an induction motor, and a drive control device of an induction motor.

BACKGROUND ART

A basic technique of vector control on an induction motor using an inverter is a prior art that has been used extensively in the industrial field. This technique is to control a torque of a motor instantaneously at a high speed through an operation of a torque component current in an orthogonal relation to a secondary magnetic flux inside the motor by operating the magnitude and the phase of an inverter output voltage separately.

The vector control of an induction motor is a technique that is being used also in the electric railroad in recent years.

A driving inverter of an electric vehicle is characterized in that the switching mode of the inverter is switched in such a manner that a multi-pulse PWM mode, which is employed generally in many cases, is used in a low speed range and a single-pulse mode is used in a medium and high speed range in which the inverter output voltage saturates and is fixed to the maximum value.

The multi-pulse PWM (pulse width modulation) mode referred to herein is a generally well-known PWM method and it is a mode to generate a PWM signal by comparing a triangular wave at a frequency of about 1 kHz with a voltage command.

The single-pulse mode referred to herein is to shape an output line-to-line voltage of the inverter to the waveform of 120° rectangular-wave conduction. Because the effective value of the fundamental wave of an inverter output voltage can be increased to the maximum and the number of pulses in a half cycle of the output voltage fundamental wave can be reduced to one, which is the minimum, it is characterized in that a compact and light inverter can be obtained by minimizing a switching loss of the inverter and making a cooling device smaller.

The waveform of 120° rectangular-wave conduction referred to herein is a voltage waveform by which a line-to-line voltage of the inverter has one pulse in a half cycle and a conduction width is 120° in electric angle.

For the inverter in an electric vehicle, it is essential to have the capability of performing stable vector control over the entire range from the multi-pulse PWM mode in a low speed range to the single-pulse mode in a medium and high speed range in which an output voltage of the inverter saturates and is fixed to the maximum value, and a vector control technique in an output voltage saturation range of the inverter and a pulse mode switching technique are crucial elements.

In particular, the magnitude of an output voltage of the inverter is fixed to the maximum voltage corresponding to an input voltage of the inverter in the output voltage saturation range of the inverter. It is therefore necessary to devise a technique to establish vector control.

In the output voltage saturation range of the inverter, in a case where an inverter output voltage command computed by a vector control device exceeds the maximum voltage that the inverter can actually output, the inverter fails to output a voltage according to the inverter output voltage command.

Accordingly, there is a discrepancy between a secondary magnetic flux command to the induction motor and a secondary magnetic flux inside the motor, which makes it difficult to perform vector control appropriately.

In order to avoid such a phenomenon, it is necessary to adjust a secondary magnetic flux command so that an inverter output voltage command will not exceed the maximum voltage that the inverter can actually output.

To be more concrete, in a case where the inverter output voltage command exceeds the maximum voltage that the inverter can actually output, the inverter output voltage command has to be lowered by lowering the secondary magnetic flux command.

Non-Patent Document 1 specified below discloses a vector control method that solves the problems discussed above.

Non-Patent Document 1 discloses that the inverter output voltage command can be corrected so as to coincide with the maximum output voltage that the inverter can actually output and hence vector control is enabled even in the output voltage saturation range of the inverter by configuring in such a manner that when an inverter output voltage command computed by the vector control device exceeds the maximum voltage that the inverter can output, a difference between the inverter output voltage command and the voltage that the inverter can actually output is inputted to a magnetic flux correction controller, so that the secondary magnetic flux command is lowered by an output of the magnetic flux correction controller.

Non-Patent Document 1: "Denatsu kotei moudo deno yuuden dendouki no bekutoru seigyo", Journal of IEEJ, Vol. 118-D, No. 9, 1998.

DISCLOSURE OF THE INVENTION

Problems that the Invention is to Solve

However, according to the vector control method of an induction motor disclosed in Non-Patent Document 1, after the inverter output voltage command deviates from the voltage that the inverter can actually output, the magnetic flux correction controller operates to adjust the secondary magnetic reflux command so that the inverter output voltage command is lowered, and operates to bring the inverter output voltage command into coincidence with the maximum voltage that the inverter can actually output.

In short, the vector control of an induction motor disclosed in Non-Patent Document 1 is configured to correct the inverter output voltage command by so-called a feedback loop.

Accordingly, there is a discrepancy between the inverter output voltage command and the output voltage of the inverter until the inverter output voltage command is corrected appropriately, which raises a problem that stable vector control cannot be performed.

In addition, it is necessary to add a feedback loop and to add a magnetic flux correction controller as a component of the feedback loop. It is therefore necessary to design control constants, which raises another problem that time and labor are required.

The invention is devised to solve the problems as discussed above and has an object to provide a vector control device of an induction motor, a vector control method of an induction motor, and a drive control device of an induction motor capable of performing stable vector control over the entire range from a low speed range to a high speed range of the induction motor without using the feedback loop.

Means for Solving the Problems

A vector control device of an induction motor of the invention is a vector control device that controls driving of an induction motor via an inverter, including: secondary magnetic flux command computing means for computing a secondary magnetic flux command to the induction motor by taking a maximum voltage that the inverter can generate into account on a basis of a torque command from an external, a DC voltage to be inputted into the inverter, and an inverter angular frequency, which is an angular frequency of an AC voltage to be outputted from the inverter; q-axis/d-axis current command generating means for generating a q-axis current command and a d-axis current command on a d-q axes rotating coordinate system in reference to a secondary magnetic flux of the induction motor on a basis of the torque command and the secondary magnetic flux command; output voltage computing means for computing an output voltage that the inverter is to output on a basis of the q-axis current command, the d-axis current command, and a circuit constant of the induction motor; and voltage command/PWM signal generating means for controlling the inverter for the inverter to output the output voltage.

Also, a vector control method of an induction motor of the invention is a vector control method of controlling driving of an induction motor via an inverter, including: computing a secondary magnetic flux command to the induction motor by taking a maximum voltage that the inverter can generate into account on a basis of a torque command from an external, a DC voltage to be inputted into the inverter, and an inverter angular frequency, which is an angular frequency of an AC voltage to be outputted from the inverter; generating a q-axis current command and a d-axis current command on a d-q axes rotating coordinate system in reference to a secondary magnetic flux of the induction motor on a basis of the torque command and the secondary magnetic flux command; computing an output voltage that the inverter is to output on a basis of the q-axis current command, the d-axis current command, and a circuit constant of the induction motor; and controlling the inverter for the inverter to output the output voltage.

A drive control device of an induction motor of the invention includes: an inverter configured to control driving of an induction motor; secondary magnetic flux command computing means for computing a secondary magnetic flux command to the induction motor by taking a maximum voltage that the inverter can generate into account on a basis of a torque command from an external, a DC voltage to be inputted into the inverter, and an inverter angular frequency, which is an angular frequency of an AC voltage to be outputted from the inverter; q-axis/d-axis current command generating means for generating a q-axis current command and a d-axis current command on a d-q axes rotating coordinate system in reference to a secondary magnetic flux of the induction motor on a basis of the torque command and the secondary magnetic flux command; output voltage computing means for computing an output voltage that the inverter is to output on a basis of the q-axis current command, the d-axis current command, and a circuit constant of the induction motor; and voltage command/PWM signal generating means for controlling the inverter for the inverter to output the output voltage.

Effects of the Invention

According to the invention, the secondary magnetic flux command to the induction motor is generated in a feed forward manner independently of the output voltage saturation state of the inverter. It is thus possible to perform stable vector control over the entire range from a low speed range to a high speed range of an induction motor without using a feedback loop for generating the secondary magnetic flux command.

DESCRIPTION OF REFERENCE NUMERALS AND SIGNS

Figure 1:
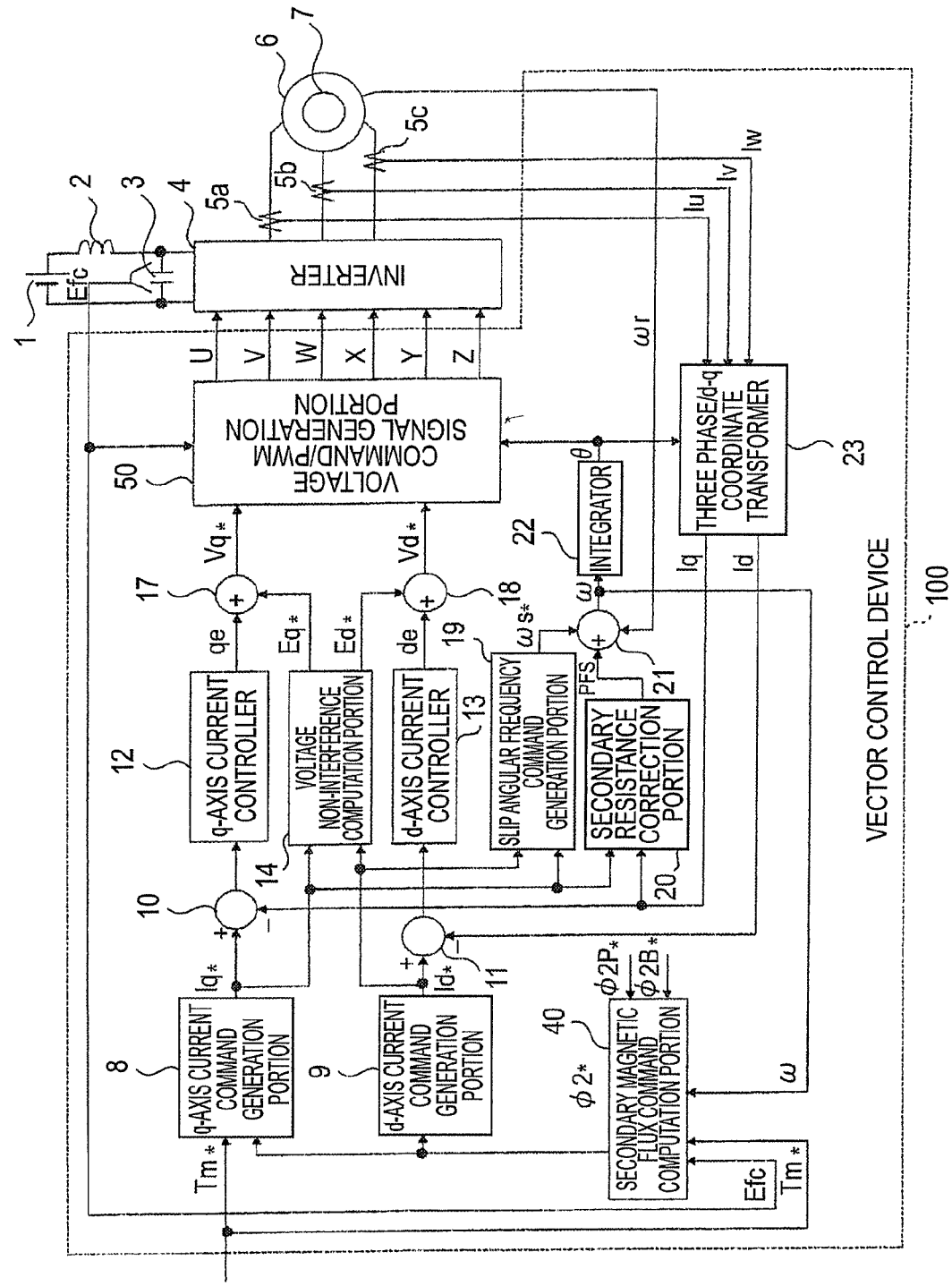
FIG. 1 is a block diagram showing the configuration of a vector control device of an induction motor according to a first embodiment of the invention.

1: DC power supply
2: reactor
3: capacitor
4: inverter
5a through 5c: current detectors
6: motor
7: speed detector
8: q-axis current command generation portion
9: d-axis current command generation portion
10 and 11: subtracters
12: g-axis current controller
13: d-axis current controller
14: voltage non-interference computation portion
17 and 18: adders
19: slip angular frequency command generation portion
20: secondary resistance correction portion
21: adder
22: integrator
23: three-phase/d-q coordinate transformer
40: secondary magnetic flux command computation portion
41: output voltage maximum value computation portion
42: maximum voltage secondary magnetic flux command computation portion
43: switch
44: lower-order preference portion
50: voltage command/PWM signal generation portion
51: modulation index computation portion
52: voltage phase angle computation portion
53: multiplier
54: adjustment gain table
55: voltage command computation portion
56: adder
57: multi-pulse carrier signal generation portion
58: synchronous three-pulse carrier signal generation portion
59: switch
60: pulse mode switching processing portion
61 through 63: comparators

64 through 66: inverting circuits
100: vector control device

Best Mode for Carrying Out the Invention

Hereinafter, one embodiment of the invention will be described on the basis of the drawings.

The same reference numerals and sings in the respective drawings denote the same or equivalent components.

First Embodiment

FIG. 1 is a block diagram showing an example of the configuration of a vector control device of an induction motor according to a first embodiment of the invention.

As is shown in the drawing, a main circuit has a DC power supply 1, an LC filter circuit formed of a reactor 2 and a capacitor 3 to suppress a harmonic current from flowing to the power supply side, an inverter 4 that converts a DC voltage Efc of the capacitor 3 to an AC voltage at an arbitrary frequency, and a vector control device 100 that performs vector control on an induction motor (hereinafter, referred to simply as the motor) 6.

It may be thought that the inverter 4 and the vector control device 100 together constitute a drive control device that controls the driving of the motor 6 by vector control.

The vector control device 100 is configured in such a manner that a signal from a speed detector 7 that detects a rotating speed of the motor 6, signals from current detectors 5a through 5c that detect currents, the voltage Efc of the capacitor 3 (more specifically, a DC voltage that is a voltage to be applied from the DC power supply 1 to the inverter 4 after it is smoothed by the capacitor 3) are inputted therein and also a torque command Tm* from an unillustrated external control device (for example, a system control portion) is inputted therein, thereby controlling a torque Tm generated by the motor 6 to coincide with the torque command Tm*.

By providing the current detectors for at least two phases, the current of the remaining one phase can be calculated through computation.

In addition, "speed sensor-less vector control method" by which the rotating speed of the motor 6 is calculated through computation without providing the speed detector 7 is now put into practical use. In such a case, the speed detector 7 is omitted.

The vector control device 100 controls the motor on the d-q axes rotating coordinate system by defining an axis coinciding with the secondary magnetic flux axis of the motor 6 as the d-axis and an axis orthogonal to the d-axis as the q-axis, and is configured to perform so-called vector control.

Hereinafter, the configurations and the operations of the respective components forming the vector control device 100 will be described.

As is shown in FIG. 1, a q-axis current command generation portion 8 and a d-axis current command generation portion 9 compute respectively a d-axis (excitation) current command Id* and a q-axis (torque) current command Iq*, respectively, in accordance with Equations (1) and (2) below using the torque command Tm* inputted from the external control device (not shown), a secondary magnetic flux command φ2* generated by the secondary magnetic flux computation portion 40, and circuit constants of the motor 6:

$$Iq^* = (Tm^*/(\phi2^* \cdot PP)) \cdot (L2/M) \quad (1)$$

$$Id^* = \phi2^*/M + L2/(M \cdot R2) \cdot s\phi2^* \quad (2).$$

Herein, in Equations (1) and (2) above, L2 is a secondary self-inductance of the motor and expressed as L2=M+l2. Also, M is a mutual inductance, l2 is a secondary leakage inductance, s is a differential operator, PP is pairs of poles of the motor 6, and R2 is secondary resistance of the motor 6.

The secondary magnetic flux command computing portion 40 is the portion forming the centerpiece of the invention and the detailed configuration and the operation will be described below.

Subsequently, a slip angular frequency command generation portion 19 computes a slip angular frequency command ωs* to be provided to the motor 6 in accordance with Equation (3) below using the d-axis current command Id*, the q-axis current command Iq*, and the circuit constants of the motor 6:

$$\omega s^* = (Iq^*/Id^*) \cdot (R2/L2) \quad (3).$$

Herein, in Equation (3) above, R2 is secondary resistance of the motor.

A secondary resistance correction portion 20 is configured to obtain a secondary resistance correcting value PFS in accordance with Equation (4) below by performing proportional-plus-integral control on a difference between the q-axis current command Iq* and the q-axis current Iq.

This configuration aims at compensating for, of the constants of the motor 6, "a change of the secondary resistance R2 with temperature" that gives significant influences to the torque control performance.

The secondary resistance correcting value PFS is outputted in accordance with Equation (4) below only in a control mode 2 described below and it is set to 0 in a control mode 1 described below.

$$PFS = (K3 + K4/s) \cdot (Iq^* - Iq) \quad (4)$$

Herein, in Equation (4) above, s is a differential operator, K3 is a proportional gain, and K4 is an integral gain. The proportional gain K3 is a coefficient to multiply a deviation between Iq* and Iq and the integral gain K4 is a coefficient to multiply an integral term of the deviation between Iq* and Iq.

The slip angular frequency command ωs* calculated in accordance with Equation (3) above, a rotating angular frequency ωr as an output of the speed detector 7 attached to the axial end of the motor 6, and the secondary resistance correcting value PFS as an output of the secondary resistance correction portion 20 are added by an adder 21 and let the sum be an inverter angular frequency ω to be outputted from the inverter 4. Then, the inverter angular frequency ω is integrated by an integrator 22, and the result of integration is inputted into a voltage command/PWM signal generation portion 50 and a three-phase/d-q axes coordinate transformer 23 described below as the basic phase angle θ of the coordinate transformation.

The three-phase/d-q axes coordinate transformer 23 converts a U-phase current Iu, a V-phase current Iv, a W-phase current Iw detected by the current detectors 5a through 5c, respectively, to a d-axis current Id and a q-axis current Iq on the d-q coordinate calculated in accordance with Equation (5) below.

$$\begin{pmatrix} Iq \\ Id \end{pmatrix} = \sqrt{\frac{2}{3}} \begin{pmatrix} \cos\theta & \cos\left(\theta - \frac{2}{3}\pi\right) & \cos\left(\theta + \frac{2}{3}\pi\right) \\ \sin\theta & \sin\left(\theta - \frac{2}{3}\pi\right) & \sin\left(\theta + \frac{2}{3}\pi\right) \end{pmatrix} \cdot \begin{pmatrix} IU \\ IV \\ IW \end{pmatrix} \quad (5)$$

Subsequently, a subtracter 10 finds a difference between the q-axis current command Iq* and the q-axis current Iq, and inputs the result (that is, the difference between Iq* and Iq) into a q-axis current controller 12 in the next stage.

The q-axis current controller 12 performs proportional-plus-integral control on the input value (that is, the difference between Iq* and Iq) and outputs a q-axis voltage compensating value qe.

Also, another subtracter 11 finds a difference between the d-axis current command Id* and the d-axis current Id, and inputs the result (that is, the difference between Id* and Id) into a d-axis current controller 13 in the next stage.

The d-axis current controller 13 performs proportional-plus-integral control on the input value (that is, the difference between Id* and Id), and outputs a d-axis voltage compensating value de.

The q-axis compensating value qe and the d-axis compensating value de are expressed, respectively, by Equations (6) and (7) below:

$$qe = (K1 + K2/s) \cdot (Iq^* - Iq) \tag{6}$$

$$de = (K1 + K2/s) \cdot (Id^* - Id) \tag{7}$$

Herein, in Equations (6) and (7) above, s is a differential operator, K1 is a proportional gain, and K2 is an integral gain.

As will be described below, after the control mode 1 (described below) has shifted to the control mode 2 (described below), qe and de are gradually reduced to 0.

Subsequently, a voltage non-interference computation portion 14 computes a d-axis feed forward voltage Ed* and a q-axis feed forward voltage Eq*, respectively, in accordance with Equations (8) and (9) below using the d-axis current command Id*, the q-axis current command Iq*, and the circuit constants of the motor 6:

$$Ed^* = (R1 + s \cdot L1 \cdot \sigma) \cdot Id^* - \omega \cdot L1 \cdot \sigma \cdot Iq^* + (M/L2) \cdot s\phi 2^* \tag{8}$$

$$Eq^* = (R1 + s \cdot L1 \cdot \sigma) \cdot Iq^* + \omega \cdot L1 \cdot \sigma \cdot Id^* + (\omega \cdot M \cdot \phi 2^*)/L2 \tag{9}$$

Herein, in Equations (8) and (9) above, σ is a leakage coefficient defined as σ=1−M²/(L1·L2).

Also, R1 is primary resistance of the motor 6 and L1 is a primary self-inductance of the motor 6 calculated as L1=M+l1.

L2 is a secondary self-inductance of the motor 6 calculated as L2=M+l2.

Herein, l1 is a primary leakage inductance and l2 is a secondary leakage inductance.

Ed* and Eq* expressed, respectively, by Equations (8) and (9) above are made up of the motor constants and the current commands (Iq* and Id*) both are known in advance and include no feedback elements. Hence, they are referred to as feed forward voltages.

Subsequently, the q-axis voltage compensating value qe and the q-axis feed forward voltage Eq* are added by an adder 17 and the d-axis voltage compensating value de and the d-axis feed forward voltage Ed* are added by another adder 18. The sum of the former and the sum of the latter are inputted into the voltage command/PWM signal generation portion 50 as a q-axis voltage command Vq* and a d-axis voltage command Vd*, respectively.

The q-axis voltage command Vq* and the d-axis voltage command Vd* are expressed, respectively, by Equations (10) and (11) below:

$$Vq^* = Eq^* + qe \tag{10}$$

$$Vd^* = Ed^* + de \tag{11}$$

An inverter output voltage command VM* in this instance is expressed by Equation (12) below:

$$VM^* = (Vd^{*2} + Vq^{*2})^{1/2} \tag{12}$$

Herein, VM* represents the magnitude of an inverter output voltage command vector.

It should be noted that the voltage non-interference computation portion 14 and the adders 17 and 18 together constitute output voltage computing means for computing the output voltage that the inverter 4 is to output.

Finally, gate signals to the switching elements U through Z (not shown) of the invert 4 are outputted from the voltage command/PWM signal generation portion 50.

Because the inverter 4 is a known voltage-source PWM inverter, the detailed configuration is omitted herein. However, to add some description in part, the switching elements U, V, and W are the switching elements disposed, respectively, in the U-phase, the V-phase, and the W-phase on the upper arm of the inverter 4, and the switching elements X, Y, and Z are switching elements disposed, respectively, in the U-phase, the V-phase, and the W-phase on the lower arm of the inverter 4.

The configurations of the secondary magnetic flux command computation portion 40 and the voltage command/PWM signal generation portion 50, which are important components of the invention, will now be described.

Figure 2:
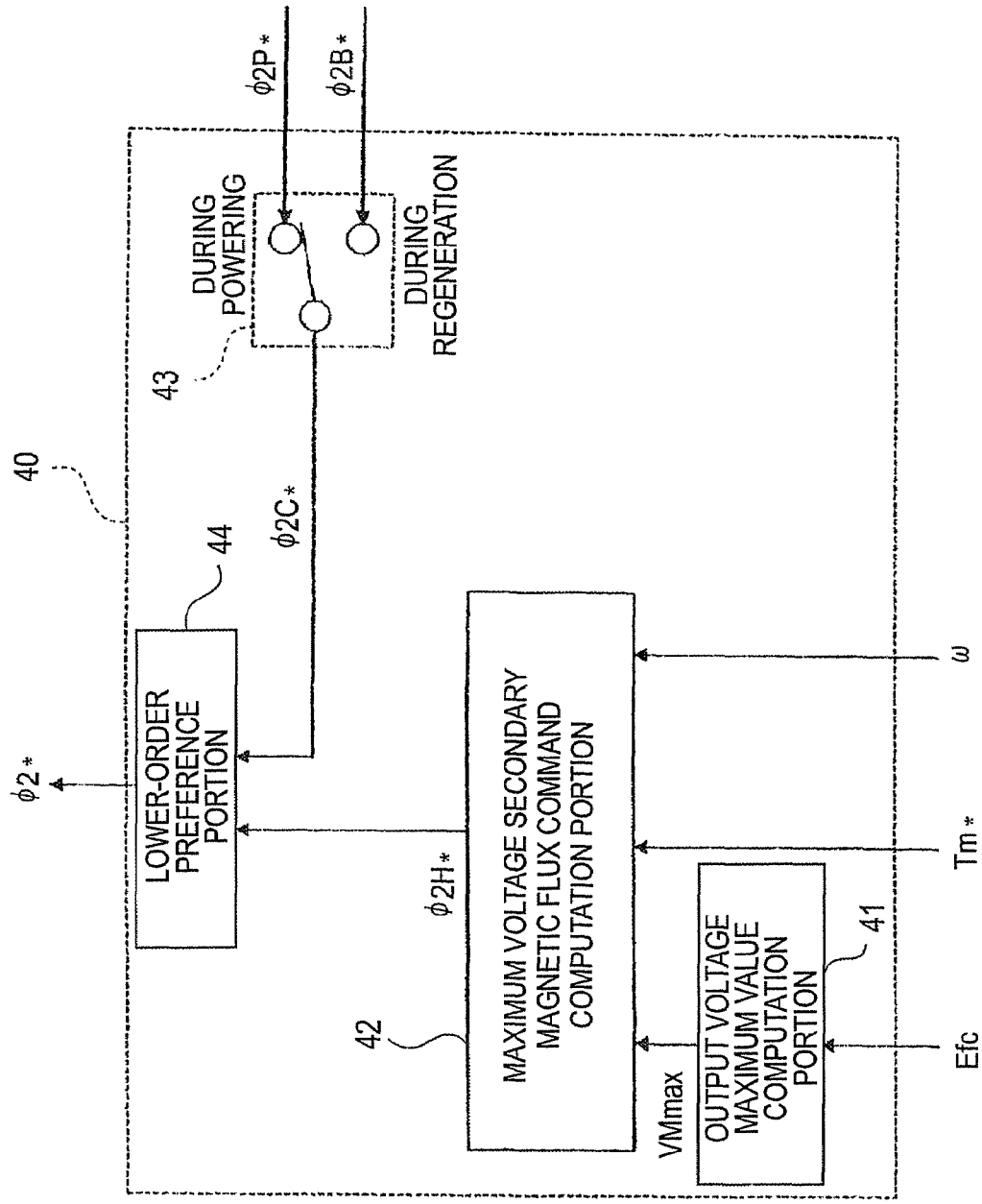
FIG. 2 is a block diagram showing an example of the configuration of a secondary magnetic flux command computation portion in the first embodiment.

FIG. 2 is a view showing an example of the configuration of the secondary magnetic flux command computation portion 40 of this embodiment.

As is shown in FIG. 2, the capacitor voltage Efc, the torque command Tm*, the inverter angular frequency ω, a powering secondary magnetic flux command φ2P*, and a brake secondary magnetic flux command φ2B* are inputted into the secondary magnetic flux command computation portion 40.

The output voltage maximum computation portion 41 calculates the maximum value VMmax of the inverter output voltage VM in accordance with Equation (13) below using the capacitor voltage Efc.

$$VMmax = \frac{\sqrt{6}}{\pi} \cdot Efc \tag{13}$$

Herein, VMmax is the maximum voltage that the inverter can output on the capacitor voltage Efc, and it is a value when the inverter 4 is operated in a, single-pulse mode in which the output line-to-line voltage waveform is of 120° rectangular-wave conduction.

Equation (13) above is an equation disclosed also in Non-Patent Document 1 specified above, and it is obtained as the fundamental wave component when the rectangular wave of 120° conduction is expanded by a Fourier series.

A secondary magnetic flux command φ2H* that is needed exactly to bring the inverter output voltage VM into coincidence with the maximum value VMmax is calculated by a maximum voltage secondary magnetic flux command computation portion 42 in accordance with Equation (14) below using the maximum value VMmax of the inverter output voltage VM calculated in accordance with Equation (13)

above, the torque command Tm*, the inverter angular frequency ω, and the constants of the motor 6.

$$\Phi 2H^* = \sqrt{\frac{-A + \sqrt{A^2 - B}}{C}} \quad (14)$$

where we define $$A = 2 \cdot R1 \cdot \omega \cdot Tm^* - VMmax^2$$

$$B = 4 \cdot \frac{\{R1^2 + (\omega \cdot L1)^2\} \cdot \{R1^2 + \sigma^2(\omega \cdot L1)^2\}}{M^4} \cdot Tm^{*2} \cdot L2^2$$

$$C = 2 \cdot \frac{R1^2 + (\omega \cdot L1)^2}{M^2}$$

Because Equation (14) above is an important equation to constitute the invention, the derivation process will be described briefly below.

On the condition that a time change of the d-axis secondary magnetic flux is moderate, a transient term is neglected from the circuit equation (known) of the motor 6 in a state where vector control is established on the d-q axes, then a d-axis voltage Vd of the motor 6 can be obtained in accordance with Equation (15) below and a q-axis voltage Vq of the motor 6 can be obtained in accordance with Equation (16) below:

$$Vd = R1 \cdot Id - \omega \cdot L1 \cdot \sigma \cdot Iq \quad (15)$$

$$Vq = R1 \cdot Iq + \omega \cdot L1 \cdot \sigma \cdot Id + (\omega \cdot M \cdot \phi 2^*)/L2 \quad (16)$$

where Vd is the d-axis voltage of the motor 6 and Vq is the q-axis voltage of the motor 6.

In addition, we find Equation (17) below from the circuit equation (known) of the motor 6:

$$-M \cdot R2 \cdot Id + (R2 + s \cdot L2) \cdot \phi 2 = 0 \quad (17).$$

Herein, in Equation (17) above, φ2 is the d-axis secondary magnetic flux of the motor 6.

Herein, by neglecting the transient term of Equation (17) above on the condition that a change of the d-axis secondary magnetic flux φ2 is moderate, we find Equation (18) below, which is a relational expression of the d-axis current Id and the d-axis secondary magnetic flux φ2:

$$Id = \phi 2/M \quad (18).$$

In a case where vector control is established, we find Equation (19) below (known), which is a relational expression of the q-axis current Iq and the torque Tm:

$$Tm = (M/L2) \cdot Iq \cdot \phi 2 \quad (19).$$

By modifying Equation (19) above, we find Equation (20) below:

$$Iq = (Tm \cdot L2)/M^2 \quad (20).$$

By substituting Equation (18) above, which is the relational expression of the d-axis current Id and the d-axis secondary magnetic flux φ2, and Equation (20) above, which is the relational expression of the q-axis current Iq and the torque Tm, into Equation (15) and Equation (16), we find Equation (21) and Equation (22) below as the d-q axes voltage of the motor 6:

$$Vd = R1 \cdot (\phi 2/M) - \omega \cdot L1 \cdot \sigma \cdot (Tm/L2)/(\phi 2 \cdot M) \quad (21)$$

$$Vq = R1 \cdot (Tm \cdot L2)/(\phi 2 \cdot M) + \omega \cdot \phi 2 \cdot L1/M \quad (22)$$

Herein, let $VM^2$ be the value of a sum of the square of Equation (21) above and the square of Equation (22) above, then we find Equation (23) below.

$$VM^2 = Vd^2 + Vq^2 \quad (23)$$

$$= \frac{R1^2(\omega \cdot L1)^2}{M} \cdot \Phi 2 + \frac{R1^2(\omega \cdot L1 \cdot \sigma)^2}{M^2 \cdot \Phi 2^2}(Tm \cdot L2)^2 +$$

$$2 \cdot R1 \cdot \frac{\omega \cdot L1 \cdot L2 \cdot Tm}{M^2}(1 - \sigma)$$

It should be noted that VM is the voltage of the motor 6 and because the voltage of the motor 6 is equal to an output voltage of the inverter 4, the term, "the inverter output voltage VM", is used in the following descriptions.

By multiplying the both sides of Equation (23) above by φ2² for arrangement, we find a quadratic equation with respect to the d-axis secondary magnetic flux φ2 of the motor 6.

By finding the solution, we find Equation (24) below.

$$\Phi 2 = \sqrt{\frac{-D + \sqrt{D^2 - E}}{F}} \quad (24)$$

where we define $$D = 2 \cdot R1 \cdot \omega \cdot Tm - VM^2$$

$$E = 4 \cdot \frac{\{R1^2 + (\omega \cdot L1)^2\} \cdot \{R1^2 + \sigma^2(\omega \cdot L1)^2\}}{M^4} \cdot Tm^2 \cdot L2^2$$

$$F = 2 \cdot \frac{R1^2 + (\omega \cdot L1)^2}{M^2}$$

It is understood that Equation (24) expresses the relation among the d-axis secondary magnetic flux φ2 of the motor 6, the inverter output voltage VM, the inverter angular frequency ω, the torque Tm of the motor 6, and the constants (R1, L1, L2, and M) of the motor 6.

By substituting the maximum value VMmax as the inverter output voltage VM, Equation (24) above expresses the relation among a generation torque Tm of the motor 6 at VMmax, the d-axis secondary magnetic flux φ2, and the inverter angular frequency ω.

In order to apply this relation at the control end, by replacing the d-axis secondary magnetic flux φ2 in Equation (24) above with the maximum voltage secondary magnetic flux command φ2H* and by replacing the torque Tm with the torque command Tm*, we find Equation (14) above.

As can be understood from the foregoing, the maximum voltage secondary magnetic flux command φ2H* obtained in accordance with Equation (14) above is the secondary magnetic flux command that is needed exactly to bring the inverter output voltage VM into coincidence with the maximum value VMmax that the inverter can output under the condition that the motor 6 is run by the torque command Tm* at the inverter angular frequency ω.

In other words, the inverter output voltage command VM* computed by the vector control device 100 using the maximum voltage secondary magnetic flux command φ2H* takes the value that is needed exactly to bring the inverter output voltage VM into coincidence with the maximum value VMmax that the inverter can output, and the inverter output voltage command VM* will never deviate from the maximum value VMmax that the inverter can output.

It is general to apply a certain rated secondary magnetic flux to the motor 6 since the motor 6 is activated until the output voltage of the inverter saturates.

It is general to ensure the rated secondary magnetic flux to the largest extent possible under the condition that the central core of iron of the motor 6 will not undergo magnetic saturation.

The optimal value differs during powering and during regeneration of the motor 6. Accordingly, as is shown in FIG. 2, a powering rated secondary magnetic flux command φ2P* is used during powering and a regeneration rated secondary magnetic flux command φ2B* is used during regeneration by switching from one to the other with a switch 43, and an output of the switch 43 is defined as a rated secondary magnetic flux command φ2C*.

The powering rated secondary magnetic flux command φ2P* and the regeneration rated secondary magnetic flux command φ2B* may be determined arbitrarily under the conditions specified above. However, they can be computed on off-line by substituting the maximum value VMmax of the inverter output voltage VM calculated by substituting a nominal DC voltage (for example, 1500 V for a typical railway) for Efc in Equation (13) above, the rated value of the torque command Tm*, the inverter angular frequency ω equal to the base frequency of the motor regulated by the vehicle performance of an electric vehicle, and the constants of the motor 6 into Equation (14) above, so that they are set preliminary in the vector control device 100. When configured in this manner, it becomes easier to design the constants of the vector control device 100.

Subsequently, a lower-order preference portion 44 chooses either the maximum voltage secondary magnetic flux command φ2H* or the rated secondary magnetic flux command φ2C*, whichever is the smaller, and generates a secondary magnetic flux command φ2* to be used ultimately for vector control.

Behaviors of an internal signal of the secondary magnetic flux command computation portion 40 configured as above will be described below.

Figure 3:
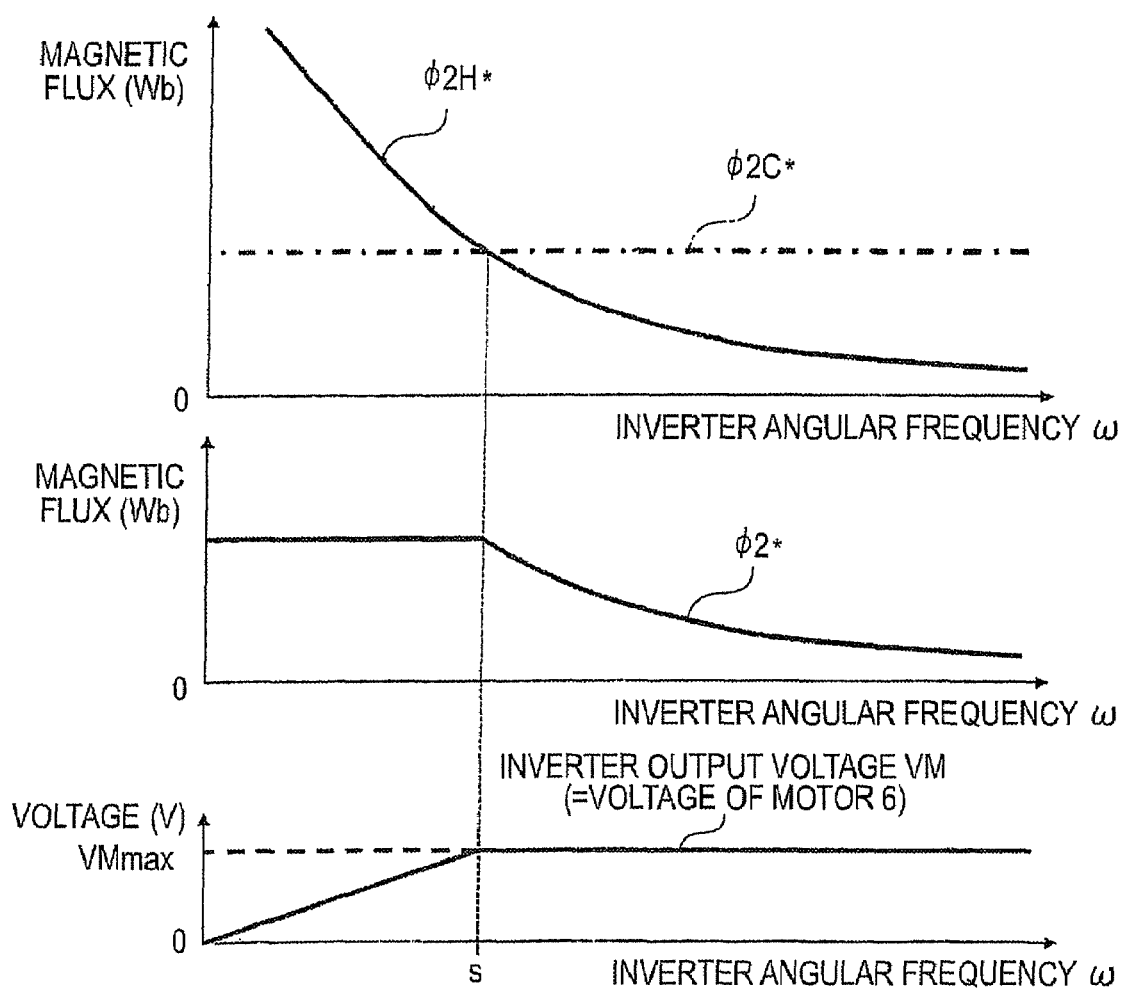
FIG. 3 is a view used to describe behaviors of an internal signal of the secondary magnetic flux command computation portion in the first embodiment.

FIG. 3 is a view used to describe behaviors of an internal signal of the secondary magnetic flux command computation portion 40 according to this embodiment of the invention.

As is shown in FIG. 3, as the secondary magnetic flux command φ2* used for vector control, the rated secondary magnetic flux command φ2C* is chosen until the output voltage of the inverter saturates (the range on the left from a capital S in FIG. 3) and the maximum voltage secondary magnetic flux command φ2H* is chosen in the output voltage saturation range of the inverter (the range on the right of the capital S in FIG. 3).

Owing to these operations, it is possible to obtain the secondary magnetic flux command φ2* that is needed exactly to bring the inverter output voltage VM into coincidence with the maximum value VMmax in the output voltage saturation range of the inverter in real time.

That is to say, because the secondary magnetic flux command φ2* is determined instantaneously without any time delay in accordance with the computing equation expressed by Equation (14) above having no feedback element using the motor constants and known amounts, the necessary secondary magnetic flux command φ2* can be obtained in real time in a feed forward manner.

The configuration of the voltage command/PWM signal generation portion 50 will now be described.

Figure 4:
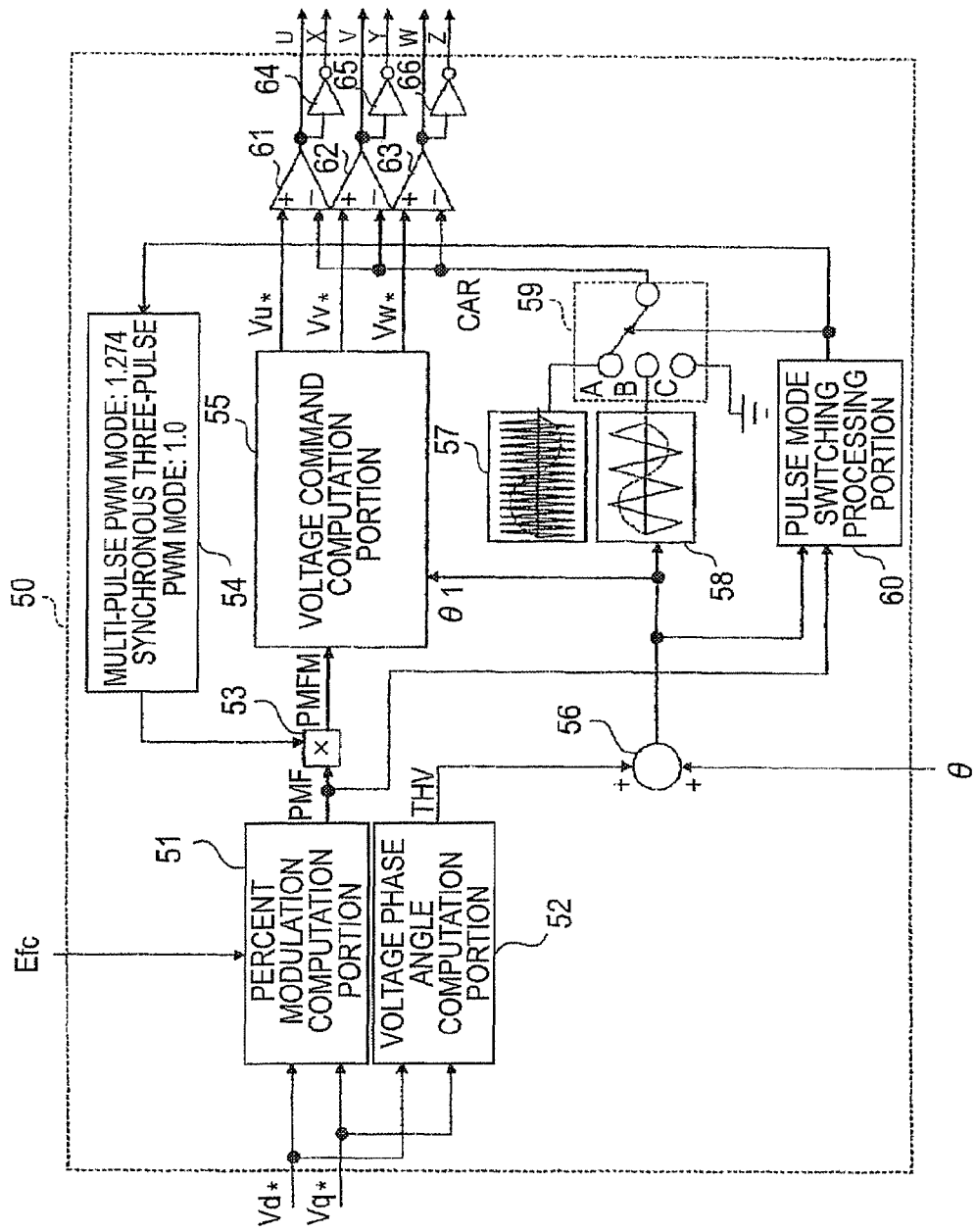
FIG. 4 is a block diagram showing an example of the configuration of a voltage command/PWM signal generation portion in the first embodiment.

FIG. 4 is a view showing an example of the configuration of the voltage command/PWM signal generation portion 50 of this embodiment.

As is shown in FIG. 4, a modulation index computation portion 51 and a voltage phase angle computation portion 52 calculate percent modulation PMF and a voltage phase angle THV, respectively, using the inverter output voltage command VM* expressed by Equation (12) above, the maximum value VMmax of the inverter output voltage VM expressed by Equation (13) above, the d-axis voltage command Vd*, and the q-axis voltage command Vq*.

The modulation index computation portion 51 and the voltage phase angle computation portion 52 respectively compute Equations (25) and (26) below.

$$PMF = \frac{VM^*}{VMmax} \quad (25)$$

$$THV = \tan^{-1} \cdot \frac{Vq^*}{Vd^*} \quad (26)$$

The voltage phase angle THV is added to the base phase angle θ by an adder 56 and the sum is inputted into a voltage command computation portion 55 and a synchronous three-pulse carrier signal generation portion 58 as a control phase angle θ1.

The percent modulation PMF represents a ratio of the inverter output voltage command VM* with respect to the maximum voltage VMmax (defined by Equation (13) above) that the inverter can output. It indicates that the inverter output voltage command VM* becomes equal to the maximum value VMmax of the inverter output voltage in a case where PMF=1.0.

The value found by multiplying the percent modulation PMF by an output of an adjustment gain table 54 by a multiplier 53 is inputted into the voltage command computation portion 55 as voltage command amplitude PMFM.

The adjustment gain table 54 is to correct a variance of the relation of the inverter output voltage VM with respect to the percent modulation PMF in the multi-pulse PWM mode and the synchronous three-pulse PWM mode and the summary is as follows.

The maximum voltage (effective value) that the inverter 4 can output without any distortion is 0.612·Efc in the multi-pulse PWM mode and 0.7797·Efc in the synchronous three-pulse PWM mode.

In short, the output voltage of the inverter with respect the percent modulation PMF in the multi-pulse PWM mode is 1/1.274 of that in the synchronous three-pulse PWM mode.

In order to cancel out this difference, the percent modulation PMF is increased by 1.274 times in the multi-pulse PWM mode and then inputted into the voltage command computation portion 55 as the voltage command amplitude PMFM.

The voltage command computation portion 55 generates a U-phase voltage command Vu*, a V-phase voltage command Vv*, and a W-phase voltage command Vw* in accordance with computing equations expressed by Equations (27)

through (29) below, respectively, using the percent modulation PMF and the control phase angle θ1.

$$Vu^* = PMFM \cdot \sin\theta 1 \quad (27)$$

$$Vv^* = PMFM \cdot \sin\left(\theta 1 - \frac{2\pi}{3}\right) \quad (28)$$

$$Vw^* = PMFM \cdot \sin\left(\theta 1 - \frac{4\pi}{3}\right) \quad (29)$$

The U-phase voltage command Vu*, the V-phase voltage command Vv*, and the W-phase voltage command Vw* are compared with a carrier signal CAR in magnitude by comparators 61 through 63, respectively, and gate signals U, V, and W are generated while gate signals X, Y, and Z are generated via inverting circuits 64 through 66, respectively.

The carrier signal CAR is a signal chosen by a pulse mode switching processing portion 60 by means of a switch 59 from a multi-pulse (generally, in the neighborhood of 1 kHz) carrier signal A generated by a multi-pulse carrier signal generation portion 57, a synchronous three-pulse carrier signal B generated by a synchronous three-pulse carrier signal generation portion 58, and a zero value C chosen in the single-pulse mode.

The pulse mode switching processing portion 60 operates to cause the switch 59 to switch to an asynchronous carrier A side in a range where the percent modulation PMF is low (0.785 or lower), to a synchronous three-pulse carrier B side in a range where the percent modulation PMF is 0.785 to 1.0 both exclusive, and to the zero value C side when the percent modulation PMF reaches 1.0, depending on the percent modulation PMF and the control phase angle θ1.

By configuring in this manner, it is possible to switch the pulse mode to the single-pulse mode at the same timing at which the percent modulation PMF reaches 1.0, that is, the inverter output voltage VM becomes equal to the maximum value VMmax.

Each of computing equations specified above are generally carried out by S/W processing in a microcomputer. In a case where the computation accuracy (the number of bits) is reduced with the aim of reducing the computation load on the microcomputer or any other reasonable aim, the percent modulation PMF does not reach exactly 1.0 at the timing at which the inverter output voltage VM becomes equal to the maximum value VMmax and may possibly take a smaller value, for example, 0.999 . . . .

However, in this case, too, the invention is feasible when the percent modulation PMF is 0.95 or higher, although a minor voltage jump occurs even when the pulse mode is switched to the single-pulse mode.

Figure 5:
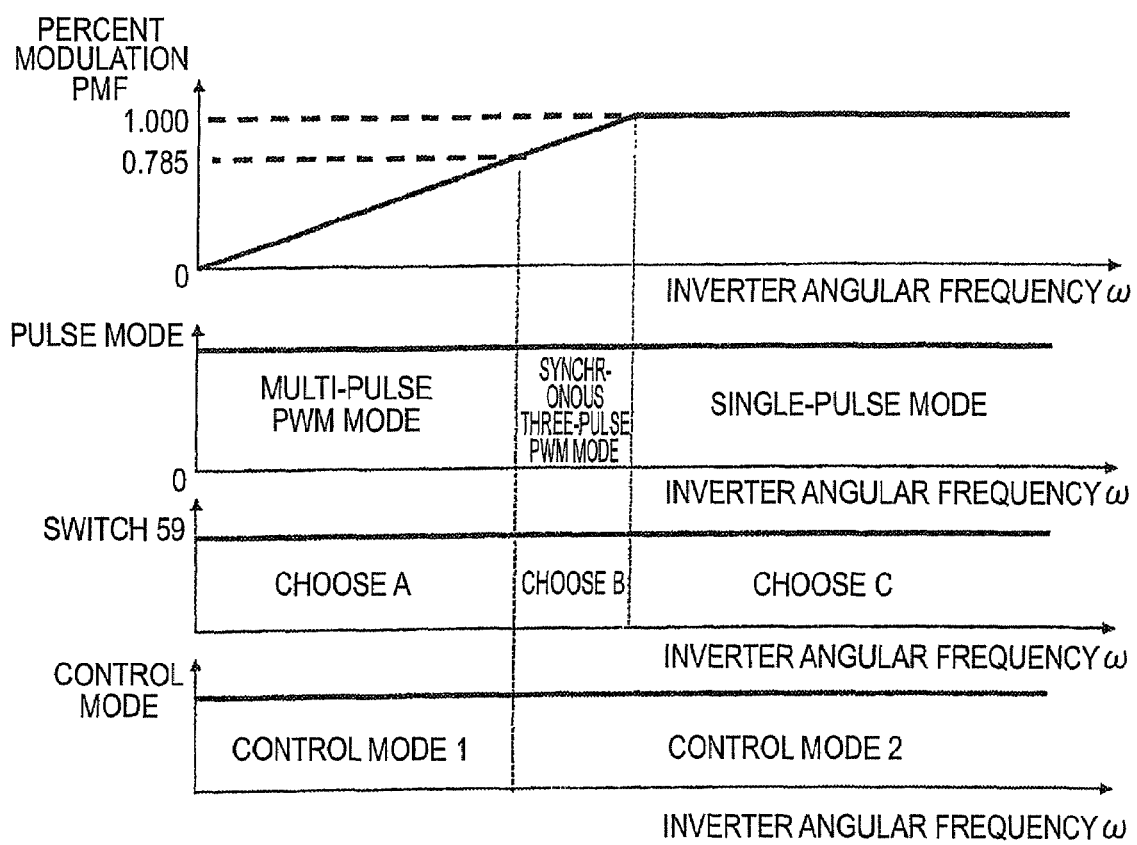
FIG. 5 is a view used to describe operations of the vector control device of an induction motor in the first embodiment.

FIG. 5 is a view used to describe transition of the inverter angular frequency ω, the percent modulation PMF, and the pulse mode, operations of the switch 59 to switch the control pulse mode, and transition of the control mode in this embodiment.

As is shown in FIG. 5, when an electric vehicle is at a low speed, that is, when the inverter angular frequency ω is low, the percent modulation PMF is small and the pulse mode is the multi-pulse PWM mode and the switch 59 chooses A (see FIG. 4).

Also, the control mode is the control mode 1 and the q-axis current controller 12 and the d-axis current controller 13 operate in accordance with Equations (6) and (7) above, respectively.

When the speed of the electric vehicle increases and the percent modulation PMF reaches or exceeds 0.785, because the output voltage saturates in the multi-pulse PWM mode, the switch 59 is switched to B and the pulse mode is switched to the synchronous three-pulse PWM mode.

Herein, the synchronous three-pulse mode is a mode necessary to output a voltage at the percent modulation PMF of 0.785 or higher.

In the multi-pulse PWM mode, it is impossible to output a voltage at the percent modulation PMF of 0.785 or higher unless over modulation (known art) is employed.

In addition, the control mode 2 is chosen as the control mode and the q-axis current controller 12 and the d-axis current controller 13 stop computations and the outputs are reduced to 0.

The outputs are reduced to 0 for the reason as follows. That is, because the number of pulses in the inverter output voltage half cycle in the synchronous three-pulse PWM mode is reduced to three from ten or more in the multi-pulse PWM mode, the control delay increases, and when computations by the q-axis current controller 12 and the d-axis current controller 13 continue in this state, there is a risk that these controllers become unstable. The computations of the q-axis current controller 12 and the d-axis current controller 13 are stopped to avoid such a risk.

In the control mode 2, the secondary resistance correction portion 20 starts to operate and computes the secondary resistance correcting value PFS in accordance with Equation (4) above.

When the speed of the electric vehicle increases further and the percent modulation PMF reaches 1.0, the switch 59 is switched to C and the pulse mode is switched to the single-pulse mode. The control mode remains in the control mode 2.

A case where the electric vehicle decreases the speed by putting on the regenerative brake is not shown in the drawing. However, the pulse mode is switched from the single-pulse mode to the synchronous three-pulse PWM mode to the multi-pulse PWM mode, the switch 59 switches from C to B to A (see FIG. 4), and the control mode shifts from the control mode 2 to the control mode 1 in the order inverse to the order described above.

Figure 6:
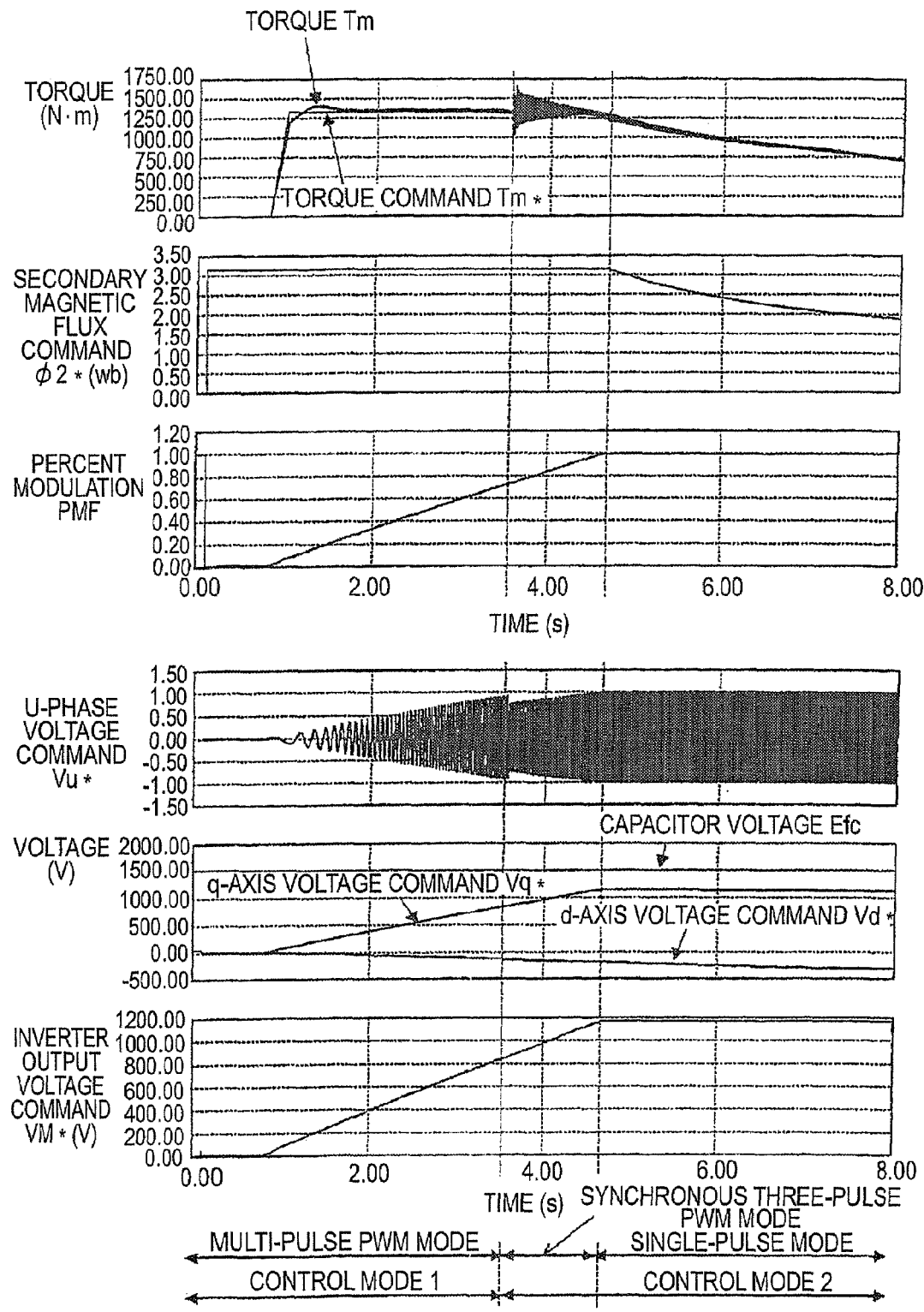
FIG. 6 is a view showing a simulation waveform in the first embodiment.

FIG. 6 is a view showing a simulation waveform of this embodiment.

FIG. 6 shows a case where the motor 6 is accelerated by powering by launching the torque command Tm* at the time about 0.8 (s) under the condition, capacitor voltage Efc=1500 V.

The multi-pulse PWM mode and the control mode 1 are chosen in an interval from the times about 0.8 (s) to 3.5 (s), and the rated secondary magnetic flux φ2C* is chosen as the secondary magnetic flux command φ2*. The motor 6 is thus excited by a certain magnetic flux.

Accordingly, the q-axis voltage command Vq* and the d-axis voltage command Vd* increase in magnitude in proportion to acceleration of the motor and so does the inverter output voltage command VM*. The percent modulation PMF also increases in association with the increasing inverter output voltage command VM*, which causes the U-phase voltage command Vu* to increase. The torque Tm of the motor 6 accelerates by following Tm* in a stable manner.

Subsequently, the pulse mode is switched to the synchronous three-pulse mode at the time about 3.5 (s) and the control mode is switched to the control mode 2.

The secondary magnetic flux command φ2* remains as the rated secondary magnetic flux φ2C* and the motor 6 is excited by a certain magnetic flux.

Accordingly, the q-axis voltage command Vq* and the d-axis voltage command Vd* continue to increase in magnitude in proportion to acceleration of the motor 6 and so does the inverter output voltage command VM*. The percent modulation PMF increases in association with the increasing inverter output voltage command VM*, which causes the U-phase voltage command Vu* to increase.

The amplitude of the U-phase voltage command Vu* reduces immediately after the switching to the synchronous three-pulse PWM mode. This is because the voltage command amplitude PMFM that has been increased by 1.274 times by the adjustment gain table 54 in the multi-pulse PWM mode as described above is switched and the scale factor is set to 1.0.

The torque Tm of the motor 6 accelerates by following Tm* in a stable manner.

Ripples are observed in the torque Tm for a while since the time about 3.5 (s). This is because the number of pulses is so small in the synchronous three-pulse PWM mode that a current ripple of the motor 6 increases. However, such ripples are negligible when an electric vehicle having a large inertia is driven. The mean value of the torque Tm coincides with the torque command Tm* and the torque Tm is therefore controlled in a stable manner.

Subsequently, the inverter output voltage saturates at the time about 4.6 (s) and at the same time the maximum voltage secondary magnetic flux command $\phi 2H^*$ computed in accordance with Equation (14) above is chosen as the secondary magnetic flux command $\phi 2^*$ by the secondary magnetic flux command computation portion 40 (see FIG. 1).

Accordingly, the percent modulation PMF is fixed at 1.0 and the inverter output voltage command VM* is fixed to the maximum voltage VMmax that the inverter can output (in this case, VMmax is found to be about 1170 V by substituting Efc=1500 V into Equation (13) above).

The torque command Tm* is reduced in inversely proportional to the rotating number in order to run the motor 6 with a constant output. It is, however, understood that the torque Tm of the motor 6 accelerates in a stable manner by following Tm*.

Figure 7:
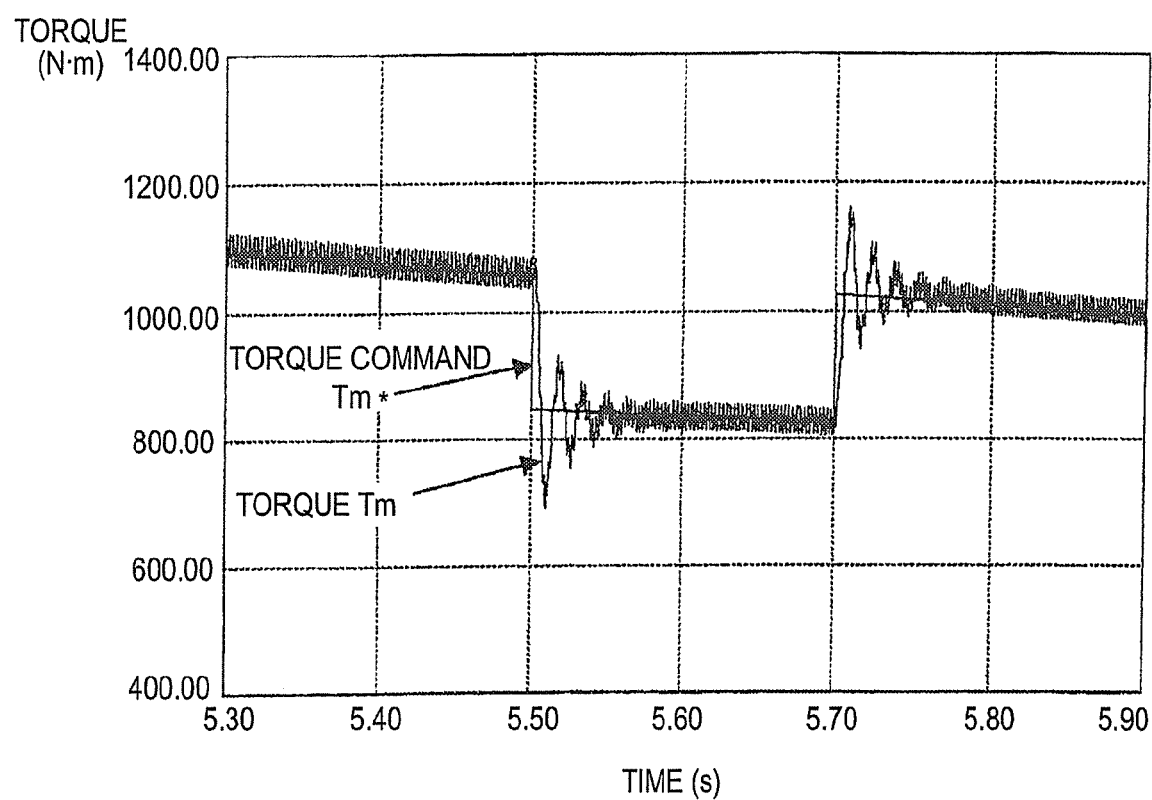
FIG. 7 is a view showing a torque response simulation waveform in the first embodiment.

FIG. 7 is a view showing a torque response simulation waveform in this embodiment.

FIG. 7 is a response waveform of the torque Tm of the motor 6 when the torque command Tm* is decreased and increased stepwise in a single-pulse mode range (an interval from the times 5.3 (s) to 5.9 (s)) of FIG. 6.

It is understood that, as is shown in FIG. 7, a high-speed response at the time constant of 10 ms or smaller is obtained and high-speed torque control by vector control is achieved even in the single-pulse mode in the voltage saturation range of the inverter.

Also, even in a case where the capacitor voltage Efc varies, it is obvious from Equation (13) and Equation (14) above that the secondary magnetic flux command $\phi 2^*$ responding to such a variance is calculated, and the control can be achieved in a stable manner in this case, too.

As has been described, according to this embodiment, it is possible to calculate the secondary magnetic flux command $\phi 2^*$ that can bring the inverter output voltage command VM* into coincidence with the maximum voltage VMmax that the inverter can output in accordance with the computing equations in real time in a feed forward manner in the voltage saturation range of the inverter independently of a variance of the torque command Tm* and the capacitor voltage Efc.

Accordingly, it is possible to achieve a vector control method for the voltage saturation range capable of, in principle, eliminating an event that the inverter output voltage command VM* deviates from the maximum voltage VMmax that the inverter can output and eliminating the need to set the control constants by making it unnecessary to add a feedback loop, such as a magnetic flux correction controller.

Further, it is possible to switch the pulse mode to the single-pulse mode at the timing at which the percent modulation PMF reaches 1.0 as the pulse mode is switched from the multi-pulse PWM mode to the synchronous three-pulse PWM mode, that is, at the timing at which the inverter output voltage becomes equal to the maximum value VMmax.

It thus becomes possible to obtain a vector control device of an induction motor capable of performing stable vector control over the entire range from the multi-pulse PWM mode in a low speed range to the single-pulse mode at a medium and high speed range, which is the output voltage saturation range of the inverter.

The configurations described in the embodiment above are mere examples of the contents of the invention. It goes without saying that the invention can be combined with other known techniques and modified without deviating from the scope of the invention by omitting the configurations in part.

In this embodiment, the secondary resistance correction portion that corrects the inverter angular frequency from a deviation between the q-axis current command and the q-axis current is operated by operating the q-axis current controller and the d-axis current controller in the multi-pulse mode and stopping the q-axis current controller and the d-axis current controller in the mode with three pulses or fewer.

There can be achieved an effect that a secondary magnetic flux command exceeding the maximum voltage that the inverter can output will not be issued without using feedback control, such as the magnetic flux correction control to find a secondary magnetic flux command by configuring in such a manner so as to operate the q-axis current controller and the d-axis current controller independently of the pulse mode, to operate the secondary resistance correction portion independently of the pulse mode without providing the q-axis current controller and the d-axis current controller, or to provide none of the q-axis current controller, the d-axis current controller, and the secondary resistance correction portion.

Further, the invention has been described in this specification in view of a power converting device in the railway field. It should be appreciated, however, that applications of the invention are not limited to this field. It goes without saying that the invention can be applied to various related fields, such as an automobile, an elevator, and an electric power system.

As has been described, a vector control device of an induction motor of the invention is a vector control, device that controls driving of an induction motor (6) via an inverter (4), and includes: secondary magnetic flux command computing means (40) for computing a secondary magnetic flux command to the induction motor (6) by taking a maximum voltage that the inverter (4) can generate into account on a basis of a torque command from an external, a DC voltage to be inputted into the inverter, and an inverter angular frequency, which is an angular frequency of an AC voltage to be outputted from the inverter; q-axis/d-axis current command generating means (8 and 9) for generating a q-axis current command and a d-axis current command on a d-q axes rotating coordinate system in reference to a secondary magnetic flux of the induction motor (6) on a basis of the torque command and the secondary magnetic flux command; output voltage computing means (voltage non-interference computation portion 14, adder 17, and adder 18) for computing an output voltage that the inverter (4) is to output on a basis of the q-axis current command, the d-axis current command, and a circuit constant of the induction motor (6); and voltage command/PWM signal generating means (50) for controlling the inverter (4) for the inverter (4) to output the output voltage.

Accordingly, the secondary magnetic flux command to the induction motor is generated in a feed forward manner independently of the output voltage saturation state of the inverter. It is thus possible to perform stable vector control over the entire range from a low speed range to a high speed range of the induction motor without using a feedback loop.

Also, the secondary magnetic flux command computing means (40) in the vector control device of an inductor motor of the invention has a maximum voltage secondary magnetic flux command computation portion (42) configured to compute a maximum voltage secondary magnetic flux command, which is a secondary magnetic flux command to bring the maximum voltage that the inverter (4) can generate and the output voltage into coincidence in magnitude, and a lower-order preference portion (44) configured to output either the maximum voltage secondary magnetic flux command or a pre-set rated secondary magnetic flux command, whichever is the smaller, as the secondary magnetic flux command.

Accordingly, even in a case where the inverter is in the voltage saturation range, not only is it possible to generate an inverter output voltage command that coincides with the maximum voltage that the inverter can output owing to the maximum voltage secondary magnetic flux command, but it is also possible to automatically switch the rated secondary magnetic flux command and the maximum voltage secondary magnetic flux command in response to the inverter output voltage command.

Also, the maximum voltage secondary magnetic flux command computation portion (42) in the vector control device of an induction motor of the invention computes the maximum voltage secondary magnetic flux command on a basis of the torque command and the inverter angular frequency.

Because the torque command and the inverter angular frequency are known and include no feedback elements, it is possible to compute the maximum voltage secondary magnetic flux command instantaneously with ease.

Also, in the vector control device of an induction motor of the invention, the maximum voltage secondary magnetic flux command is computed in accordance with Equation (14) above.

Because the maximum voltage secondary magnetic flux command is determined uniquely in accordance with the computing equation expressed by Equation (14) above including no feedback elements, there is no need to adjust the control constants within the feedback loop and the maximum voltage secondary magnetic flux command can be computed instantaneously with ease in comparison with a case where the feedback loop is included.

Also, in the vector control device of an induction motor of the invention, the rated secondary magnetic flux command has at least two kinds of values including a value applied during powering of the induction motor (6) and a value applied during regeneration and is configured to be capable of switching the values according to a running state of the induction motor (6).

Accordingly, even in a case where the optimal rated secondary magnetic flux command for the induction motor differs during powering and during regeneration, it becomes possible to control the induction motor by applying the optimal rated secondary magnetic flux command.

Also, in the vector control device of an induction motor of the invention, the rated secondary magnetic flux command is a value set through preliminary computation using the computing equation expressed by Equation (14) above. Accordingly, it is possible to calculate the optimal rated secondary magnetic flux command easily using the motor constant.

Also, in the vector control device of an induction motor of the invention, a pulse mode of the inverter (4) is switched in response to percent modulation of the inverter (4) computed on a basis of the secondary magnetic flux command and the torque command.

Accordingly, it is possible to change the fundamental wave components of the actual output voltage of the inverter continuously according to the inverter output voltage command that varies with the secondary magnetic flux command and the inverter frequency.

Also, in the vector control device of an induction motor of the invention, the inverter (4) is operated in a single-pulse mode when percent modulation of the inverter (4) computed on a basis of the secondary magnetic flux command is 0.95 or higher.

It thus becomes possible to shift the output voltage of the inverter continuously to the maximum value.

Also, the vector control device of an induction motor of the invention further includes: a current detector (5a through 5c) configured to measure a current flowing through the induction motor (6); a three-phase/d-q axes coordinate transformer (23) configured to convert the current detected by the current detector (5a through 5c) to a q-axis current and a d-axis current, which are values on the d-q axes rotating coordinate system; q-axis current control means (12) for operating so as to lessen a deviation between the q-axis current command and the q-axis current; and d-axis current control means (13) for operating so as to lessen a deviation between the d-axis current command and the d-axis current, wherein the output voltage computing means (formed of voltage non-interference computation portion 14, adder 17, and adder 18) computes the output voltage using outputs of the q-axis current control means (12) and the d-axis current control means (13), and computations by the q-axis current control means (12) and the d-axis current control means (13) are stopped in a case where the number of pulses in a half cycle generated by the inverter (4) is three or smaller. It is therefore possible to ensure the stability of vector control.

Also, in the vector control device of an induction motor of the invention, the inverter angular frequency is corrected using a deviation between the q-axis current command and the q-axis current in a case where the number of pulses in the half cycle generated by the inverter (4) is three or smaller. It is therefore possible to ensure the accuracy of torque control (that is, to minimize an error between the torque command and the actual torque).

Also, the vector control device of an induction motor of the invention is applied to a motor control device of an electric vehicle. Accordingly, it is possible to obtain a vector control system capable of driving an electric vehicle in a stable manner over a range from a low speed to a high speed where the output voltage of the inverter saturates. Also, it is possible to obtain a vector control device of an induction motor capable of minimizing a loss of the inverter and making the inverter smaller and lighter and therefore suitable to an electric vehicle.

Also, a vector control method of an induction motor of the invention is a vector control method of controlling driving of an induction motor (6) via an inverter (4), including: computing a secondary magnetic flux command to the induction motor (6) by taking a maximum voltage that the inverter (4) can generate into account on a basis of a torque command from an external, a DC voltage to be inputted into the inverter (4), and an inverter angular frequency, which is an angular frequency of an AC voltage to be outputted from the inverter (4); generating a q-axis current command and a d-axis current command on a d-q axes rotating coordinate system in reference to a secondary magnetic flux of the induction motor (6) on a basis of the torque command and the secondary magnetic flux command; computing an output voltage that the inverter (4) is to output on a basis of the q-axis current command, the d-axis current command, and a circuit constant of the induction motor; and controlling the inverter (4) for the inverter (4) to output the output voltage.

Accordingly, the secondary magnetic flux command is generated in a feed forward manner independently of the output voltage saturation state of the inverter. It is thus possible to provide a control method capable of performing stable vector control over the entire range from a low speed range to a high speed range of the induction motor without using a feedback loop for generating the secondary magnetic flux command.

Also, a drive control device of an induction motor of the invention includes: an inverter (4) configured to control driving of an induction motor (6); secondary magnetic flux command computing means (40) for computing a secondary magnetic flux command to the induction motor (6) by taking a maximum voltage that the inverter (4) can generate into account on a basis of a torque command from an external, a DC voltage to be inputted into the inverter (4), and an inverter angular frequency, which is an angular frequency of an AC voltage to be outputted from the inverter (4); q-axis/d-axis current command generating means (8 and 9) for generating a q-axis current command and a d-axis current command on a d-q axes rotating coordinate system in reference to a secondary magnetic flux of the induction motor (6) on a basis of the torque command and the secondary magnetic flux command; output voltage computing means (voltage non-interference computation portion 14) for computing an output voltage that the inverter (4) is to output on a basis of the q-axis current command, the d-axis current command, and a circuit constant of the induction motor (6); and voltage command/PWM signal generating means (50) for controlling the inverter (4) for the inverter (4) to output the output voltage.

It is thus possible to obtain a drive control device capable of controlling the driving of the induction motor in a stable manner over the entire range from a low speed range to a high speed range without using a feedback loop for generating the secondary magnetic flux command.

INDUSTRIAL APPLICABILITY

The invention is useful in achieving a vector control device of an induction motor capable of performing stable vector control over the entire range from a low speed range to a high speed range of an induction motor without using a feedback loop for generating a secondary magnetic flux command.

The invention claimed is:

1. A vector control device that controls driving of an induction motor via an inverter, comprising:
a secondary magnetic flux command computing module that computes a secondary magnetic flux command for the induction motor by taking a maximum voltage that the inverter can generate into account on a basis of a torque command from an external source, a DC voltage to be input into the inverter, and an inverter angular frequency, which is an angular frequency of an AC voltage to be output from the inverter;
a q-axis/d-axis current command generator that generates a q-axis current command and a d-axis current command on a d-q axes rotating coordinate system in reference to a secondary magnetic flux of the induction motor on a basis of the torque command and the secondary magnetic flux command;
an output voltage computing module that computes an output voltage that the inverter is to output on a basis of the q-axis current command, the d-axis current command, and a circuit constant of the induction motor; and
a voltage command/PWM signal generator for controlling the inverter to output the output voltage;
wherein the secondary magnetic flux command computing module has:
an output voltage maximum value computation portion configured to compute the maximum voltage that the inverter can generate on a basis of the DC voltage applied to the inverter;
a maximum voltage secondary magnetic flux command computation portion configured to compute a maximum voltage secondary magnetic flux command, which is a secondary magnetic flux command to bring the maximum voltage that the inverter can generate and the output voltage into coincidence in magnitude; and
a lower-order preference portion configured to choose and output either the maximum voltage secondary magnetic flux command or a pre-set rated secondary magnetic flux command, whichever is the smaller, as the secondary magnetic flux command.

2. The vector control device of an induction motor according to claim 1, wherein:
the maximum voltage secondary magnetic flux command computation portion computes the maximum voltage secondary magnetic flux command on a basis of the torque command and the inverter angular frequency.

3. The vector control device of an induction motor according to claim 1, wherein:
the maximum voltage secondary magnetic flux command is computed in accordance with the following equation $$\Phi 2H^* = \sqrt{\frac{-A + \sqrt{A^2 - B}}{C}}$$

where:

$$A = 2 \cdot R1 \cdot \omega \cdot Tm^* - VMmax^2$$

$$B = 4 \cdot \frac{\{R1^2 + (\omega \cdot L1)^2\} \cdot \{R1^2 + \sigma^2(\omega \cdot L1)^2\}}{M^4} \cdot Tm^{*2} \cdot L2^2$$

$$C = 2 \cdot \frac{R1^2 + (\omega \cdot L1)^2}{M^2}$$

and where VMmax is a maximum value of the output voltage of the inverter, Tm* is the torque command, ω is the inverter angular frequency, R1 is a primary resistance of the motor, M is a mutual inductance of the motor, σ is a leakage coefficient, L1 is a primary self-inductance of the motor, and L2 is a secondary self-inductance of the motor.

4. The vector control device of an induction motor according to claim 1, wherein:
the rated secondary magnetic flux command has at least two kinds of values including a value applied during powering of the induction motor and a value applied during regeneration and is configured to be capable of switching the values according to a running state of the induction motor.

5. The vector control device of an induction motor according to claim 3, wherein:
the rated secondary magnetic flux command is a value set through preliminary computation using the equation.

6. The vector control device of an induction motor according to claim 1, wherein:
a pulse mode of the inverter is switched in response to percent modulation of the inverter computed on a basis of the secondary magnetic flux command and the torque command.

7. The vector control device of an induction motor according to claim 1, further comprising:
a current detector configured to measure a current flowing through the induction motor;
a three-phase/d-q axes coordinate transformer configured to convert the current detected by the current detector to a q-axis current and a d-axis current, which are values on the d-q axes rotating coordinate system;
a q-axis current control module that operates to lessen a deviation between the q-axis current command and the q-axis current; and
a d-axis current control module that operates to lessen a deviation between the d-axis current command and the d-axis current,
wherein:
the output voltage computing module computes the output voltage using outputs of the q-axis current control and the d-axis current control module and
computations by the q-axis current control module and the d-axis current control module are stopped in a case where a half cycle generated by the inverter contains three or fewer pulses.

8. The vector control device of an induction motor according to claim 7, wherein:
the inverter angular frequency is corrected using a deviation between the q-axis current command and the q-axis current in a case where the number of pulses in the half cycle generated by the inverter is three or less.

9. The vector control device of an induction motor according to claim 1, wherein:
the inverter is operated in a single-pulse mode when percent modulation of the inverter computed on a basis of the secondary magnetic flux command is 0.95 or higher.

10. The vector control device of an induction motor according to claim 1, wherein:
the vector control device is applied to a motor control device of an electric vehicle.

11. A vector control method of controlling driving of an induction motor via an inverter, comprising:
computing a secondary magnetic flux command for the induction motor by taking a maximum voltage that the inverter can generate into account on a basis of a torque command from an external source, a DC voltage to be input into the inverter, and an inverter angular frequency, which is an angular frequency of an AC voltage to be output from the inverter;
generating a q-axis current command and a d-axis current command on a d-q axes rotating coordinate system in reference to a secondary magnetic flux of the induction motor on a basis of the torque command and the secondary magnetic flux command;
computing an output voltage that the inverter is to output on a basis of the q-axis current command, the d-axis current command, and a circuit constant of the induction motor; and
controlling the inverter to output the output voltage,
wherein the step of computing of the secondary magnetic flux command includes:
computing the maximum voltage that the inverter can generate on a basis of the DC voltage applied to the inverter;
computing a maximum voltage secondary magnetic flux command, which is a secondary magnetic flux command to bring the maximum voltage and the output voltage into coincidence in magnitude; and
choosing and outputting either the maximum voltage secondary magnetic flux command or a pre-set rated secondary magnetic flux command, whichever is the smaller as the secondary magnetic flux command.

12. A drive control device of an induction motor, comprising:
an inverter configured to control driving of an induction motor;
a secondary magnetic flux command computing module that computes a secondary magnetic flux command for the induction motor by taking a maximum voltage that the inverter can generate into account on a basis of a torque command from an external source, a DC voltage to be input into the inverter, and an inverter angular frequency, which is an angular frequency of an AC voltage to be output from the inverter;
a q-axis/d-axis current command generator that generates q-axis current command and a d-axis current command on a d-q axes rotating coordinate system in reference to a secondary magnetic flux of the induction motor on a basis of the torque command and the secondary magnetic flux command;
an output voltage computing module that computes an output voltage that the inverter is to output on a basis of the q-axis current command, the d-axis current command, and a circuit constant of the induction motor; and
a voltage command/PWM signal generator for controlling the inverter to output the output voltage,
wherein the secondary magnetic flux command computing module has:
an output voltage maximum value computation portion configured to compute the maximum voltage that the inverter can generate on a basis of the DC voltage applied to the inverter;
a maximum voltage secondary magnetic flux command computation portion configured to compute a maximum voltage secondary magnetic flux command, which is a secondary magnetic flux command to bring the maximum voltage and the output voltage into coincidence in magnitude; and
a lower-order preference portion configured to choose and output either the maximum voltage secondary magnetic flux command or a pre-set rated secondary magnetic flux command, whichever is the smaller, as the secondary magnetic flux command.

* * * * *